Jan. 11, 1938.  J. C. SANDERS  2,105,055
RETRACTABLE GUN MOUNT
Filed Feb. 2, 1935  2 Sheets-Sheet 1
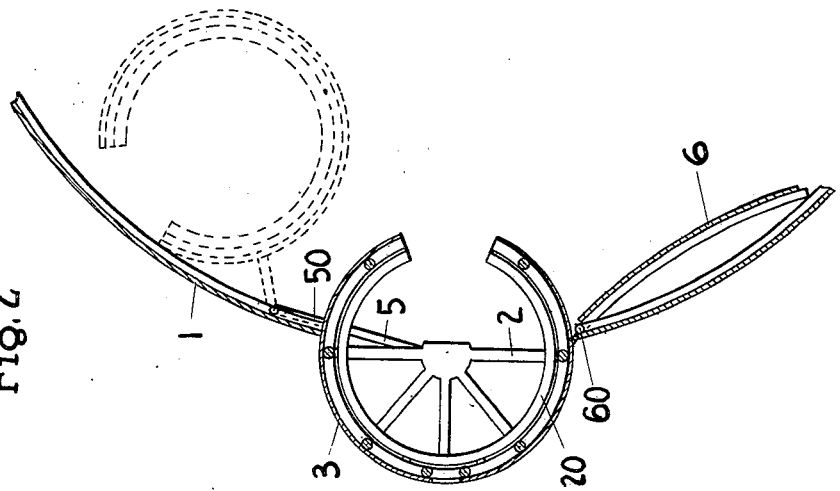
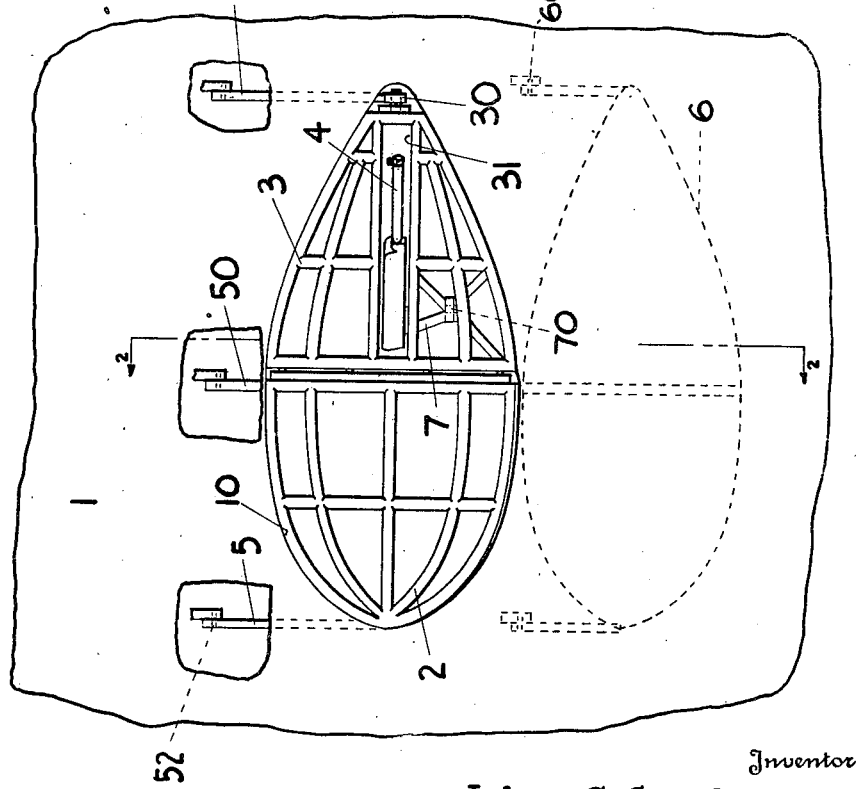
Inventor
John C. Sanders
By Charles L. Reynolds
Attorney Jan. 11, 1938.　　　　　J. C. SANDERS　　　　　2,105,055
RETRACTABLE GUN MOUNT
Filed Feb. 2, 1935　　　　　2 Sheets-Sheet 2
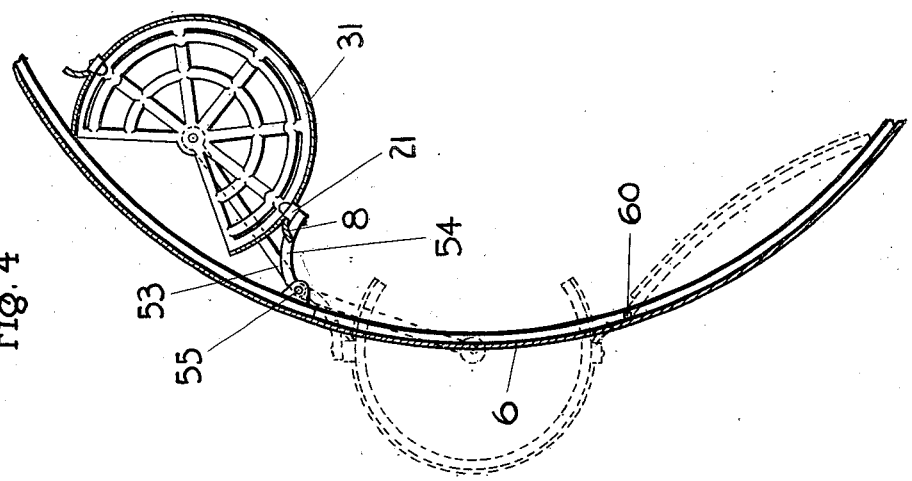
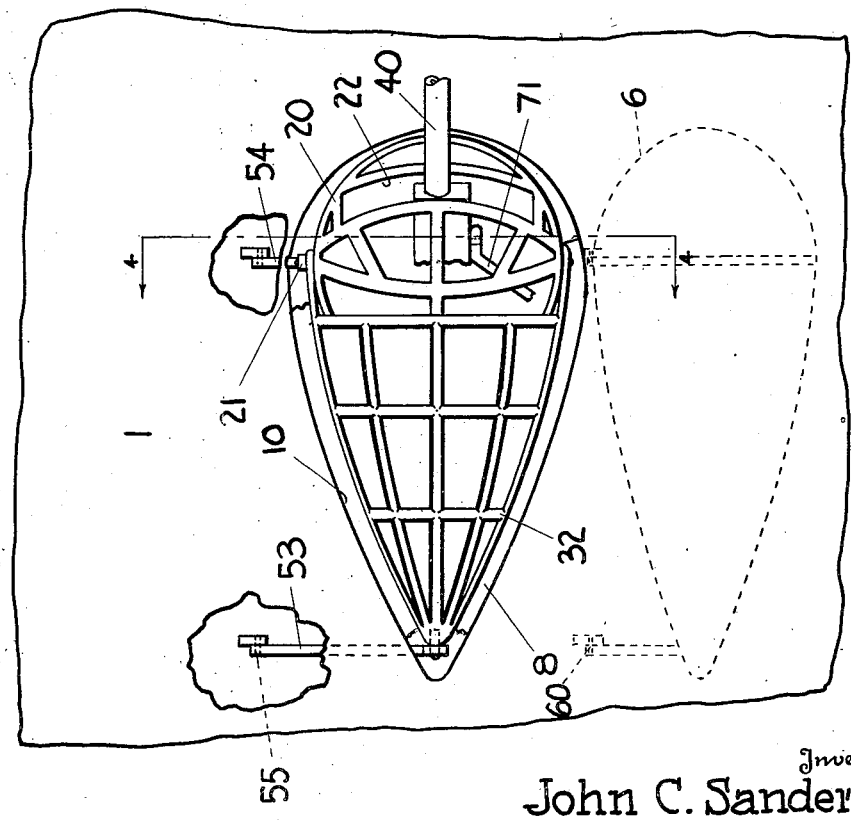
Inventor
John C. Sanders
By Charles L. Reynolds
Attorney Patented Jan. 11, 1938

2,105,055

UNITED STATES PATENT OFFICE 2,105,055

RETRACTABLE GUN MOUNT

John C. Sanders, Seattle, Wash., assignor to Boeing Aircraft Company, Seattle, Wash., a corporation of Washington Application February 2, 1935, Serial No. 4,681

7 Claims. (Cl. 89—37.5)

My invention relates to gun mounts for use upon aircraft structure, which mounts, by way of example, may be of the general type shown in my application Serial No. 749,040, filed October 17, 1934, or in the patent of Edward C. Wells, Serial No. 2,044,036.

In large bombing planes it is necessary that the guns be so mounted that they may fire through a large field of fire, preferably exceeding a quarter sphere, and therefore they should project from the airplane. When they project from the airplane it is highly desirable that they be encased as largely as possible and shielded from the air stream, also that the gunner be shielded from the air stream, and these considerations led to the inventions referred to above, these inventions having the further advantage of lessening the drag created by projecting parts, by reason of the shells encasing the guns being of streamline shape.

Such mounts and shells nevertheless create some drag, and it is of paramount importance that drag be reduced to the absolute minimum, especially for normal flight conditions, when the bomber is approaching its objective or returning to its base. The only time when the guns need to be projected is during an attack by hostile planes or ground installations, or when such an attack is imminent. Accordingly it is an object of the present invention to provide such a gun mount having all the advantages of either or both of the gun mounts mentioned above, yet capable of being withdrawn or retracted within the aircraft structure, to the end that the streamline contour of the aircraft structure may be restored and the drag created by the gun-encasing shells may be eliminated and the speed of the aircraft increased by so much, and, furthermore, capable of being placed in firing position quickly and easily, when needed.

With the above objects and others in mind, as will appear hereafter, my invention comprises the novel gun support and closure, in combination with the aircraft structure, as shown in the accompanying drawings, described in this specification, and as will be more particularly pointed out and defined by the claims.

In the accompanying drawings I have shown my invention incorporated in certain illustrative forms.

Figure 1 is an elevation of a gun support in position for firing, illustrating a rearwardly firing gun, and Figure 2 is a transverse section through the same on the line 2—2 of Figure 1.

Figure 3 is a view similar to Figure 1, showing a forwardly firing gun, and Figure 4 is a section substantially on the line 4—4 of Figure 3, but showing the gun support retracted within the aircraft structure.

The aircraft structure 1 is provided with an aperture 10 in its skin, which aperture is of a size and shape to be substantially closed by a gun mount 7 and the encasing shell for the same when the latter is projected through the aperture 10 to place the gun in firing position. The particular form of the shell is largely immaterial, though preferably it should be of streamline shape, to offer the minimum of resistance when projected through the skin of the aircraft structure. This shell may be of the general type or types shown in the Wells application, referred to above, or any other suitable type. In the form shown in Figures 1 and 2, the shell is formed of a front section 2 which, when the complete enclosure is projected, remains stationary, and a rear section 3 which under the same conditions may move with respect to the portion 2. As is best illustrated in Figure 2, the rear section 3 is rotatably mounted upon a track 20 which is carried by the forward section 2, so that the rear section 3 may rotate with respect to the forward section 2 about a longitudinal axis, the rear end of the rear section being carried in a journal 30. The rear section is slotted, as indicated at 31, and a gun 4 is carried by a mount 7 to project and swing through the slot 31 upon an upright axis 70, that is, an axis at right angles to the axis about which the section 3 rotates, so that within the limits prescribed by the slot 31 and the aperture 10 the gun has substantially universal movement and may cover approximately a quarter sphere of fire.

Whereas in the Wells patent the fixed section, corresponding to the section 2, was formed as an integral part of the aircraft structure, in the present instance this section and the bearing 30 for the rear end of the rotatable rear section are supported from the aircraft structure in such a way that the entire shell 2, 3 may be swung into the aircraft structure into the dotted line position shown in Figure 2, or may be projected through the aperture 10 into firing position. This support may conveniently be accomplished by means of supporting arms 5, 50 and 51 pivotally secured to the inside of the skin of the aircraft structure, as indicated at 52.

The entire shell being of streamline shape, it offers a minimum of resistance when projected through the aperture, and when it is retracted the streamline shape of the aircraft skin is restored by a door or other suitable closure, indicated at 6 and pivotally mounted at 60. This closure is of such shape that when the shell is retracted it will completely fill the aperture 10 and restore the streamline shape of the aircraft structure.

In Figures 3 and 4 is illustrated a forwardly firing gun, designated 40 to distinguish it from the gun 4. The gun 40 is supported in a spherical portion 20 journaled at 21 upon the fixed portion 32 to swing with respect to the portion 32 upon an upright axis. The gun, as in the Wells patent, is carried upon a mount indicated at 71, within the spherical portion 20, which permits its swinging about a transverse axis, the sphere being slotted, as indicated at 22, to accommodate this swinging, and thus the gun 40 is given a substantially universal movement within the limits permitted by the slot 22 and the location of the forward edge of the fixed portion 32. While the portion 32 is referred to as a fixed member, and it may be considered as fixed when it is projected through the aperture 10, yet it is carried by the arms 53 and 54 pivoted at 55 upon the inside of the aircraft structure, so that the entire shell may be swung back into the airplane structure. A door 6 is provided as before of a size and shape to close the aperture when the shell is retracted, and to restore the streamline shape of the aircraft structure at such time.

It is not essential that fairing be employed between the edges of the shell and the aperture through which the latter protrudes, since the fit may be made fairly close and the shell is projected only a comparatively small part of the time. However, it is within the scope of my invention to provide fairing members, illustrated at 8 in Figures 3 and 4, which may be employed to close any space between the shell and the edge of the aperture, and partially at least to fair the shell into the skin of the aircraft structure.

The drawings illustrate a gun projecting from the side of an airplane fuselage, but it will be evident that it might equally well project from the top or bottom, or from a nacelle or wing, and it will also be evident that such a gun might be carried by a lighter-than-air craft.

What I claim as my invention is:

1. A gun mount for a streamlined aircraft structure having an aperture in its skin, a two-part shell enclosing the gun mount, means supporting the shell for movement from within the aircraft structure through such aperture, the shell being of streamlined shape and substantially filling the aperture, and one of the parts of the shell being movable relatively to the other part, the gun mount being carried by the movable part, whereby the gun may be fired through an angular field.

2. A gun mount for a streamlined aircraft structure having an aperture in its skin, a two-part shell enclosing the gun mount, means supporting the shell for movement from within the aircraft structure through such aperture, the shell being of streamlined shape and substantially filling the aperture, and one of the parts of the shell being movable relatively to the other part, the gun mount being carried by the movable part, and swingable relatively to such movable part, and the latter being slotted, whereby the gun may be fired through a part-spherical field.

3. A gun mount for an aircraft structure having an aperture in the skin thereof, an enclosure to carry said gun mount, in operative position protruding through and substantially filling the skin aperture, said enclosure having a rotatable element, rotative means guiding said rotatable element, when enclosure is in operative position, for rotation about an axis substantially parallel to the skin aperture to traverse said gun mount, and means supporting said enclosure for movement from such operative position into an inoperative position withdrawn from the skin aperture completely within the aircraft structure.

4. A gun mount for an aircraft structure having an aperture in the skin thereof, an enclosure to carry said gun, in operative position protruding through and substantially filling the skin aperture, said enclosure including a rotatable element, rotative means guiding said rotatable element, when the enclosure is in operative position, for rotation about an axis substantially parallel to the skin aperture to traverse said gun mount, a plurality of arms carrying the enclosure at one end thereof, and hinge means supporting the other end of said arms from the aircraft structure for swinging said enclosure about an axis parallel to the axis of said rotative means from operative position into an inoperative position withdrawn from the skin aperture completely within the aircraft structure.

5. A gun mount for a hollow aircraft structure having an aperture in the skin thereof, an enclosure to carry said gun mount, rotative means supporting said enclosure for rotation about an axis to traverse said gun mount, and means supporting said enclosure and rotative means from the aircraft structure and guiding the same for movement between an operative position, wherein the enclosure protrudes through the skin aperture and the axis of said rotative means lies substantially in the skin aperture, and an inoperative position, wherein the enclosure is withdrawn completely within the aircraft structure.

6. A gun mount for a hollow aircraft structure having an aperture in the skin thereof, an enclosure to carry said mount, rotative means supporting said enclosure for rotation about an axis to traverse said gun mount, and hinge means carrying by one end said enclosure and rotative means and supported by its other end from said aircraft structure, guiding said rotative means for movement through a path wherein the axis of said rotative means is always disposed substantially parallel to the hinge means axis and to the skin aperture, between an operative position, wherein the enclosure protrudes through the skin aperture and the axis of said rotative means lies substantially in the skin aperture, and an inoperative position, wherein the enclosure is withdrawn completely within the aircraft structure.

7. A gun mount for a hollow aircraft structure having an aperture in the skin thereof, an enclosure to carry said gun mount, in the shape of a body of revolution, rotative means supporting said enclosure for rotation about its generating axis to traverse said gun mount, and hinge means carrying by one end said enclosure and rotative means and supported by its other end from said aircraft structure, guiding said rotative means for movement between an operative position, wherein the enclosure protrudes through the skin aperture and the generating axis lies substantially in the skin aperture, and an inoperative position, wherein the enclosure is withdrawn completely within the aircraft structure.

JOHN C. SANDERS.